Aug. 6, 1929.  F. A. LUNDAHL  1,723,553
VELOCIPEDE
Filed Oct. 13, 1926  4 Sheets-Sheet 3

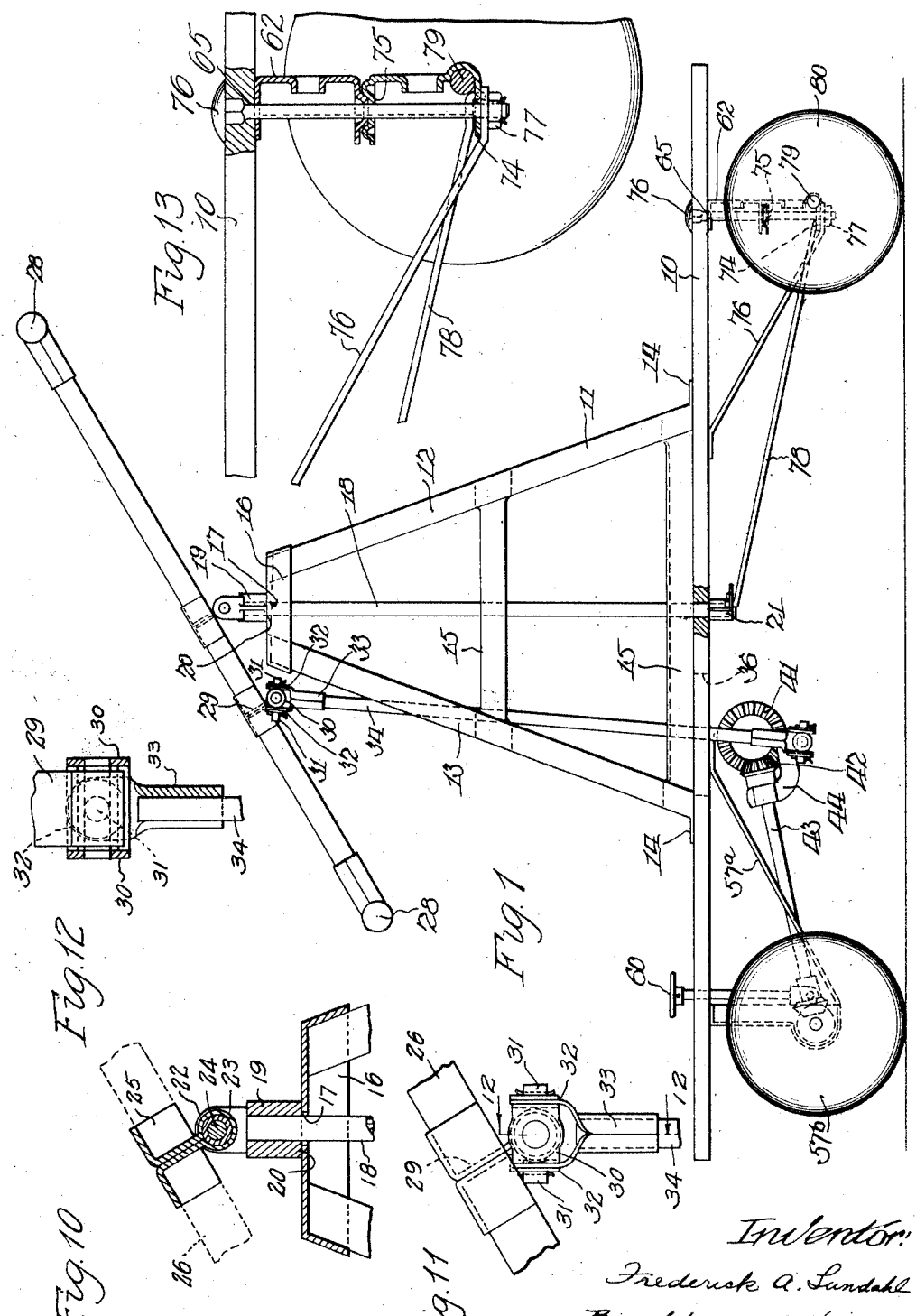

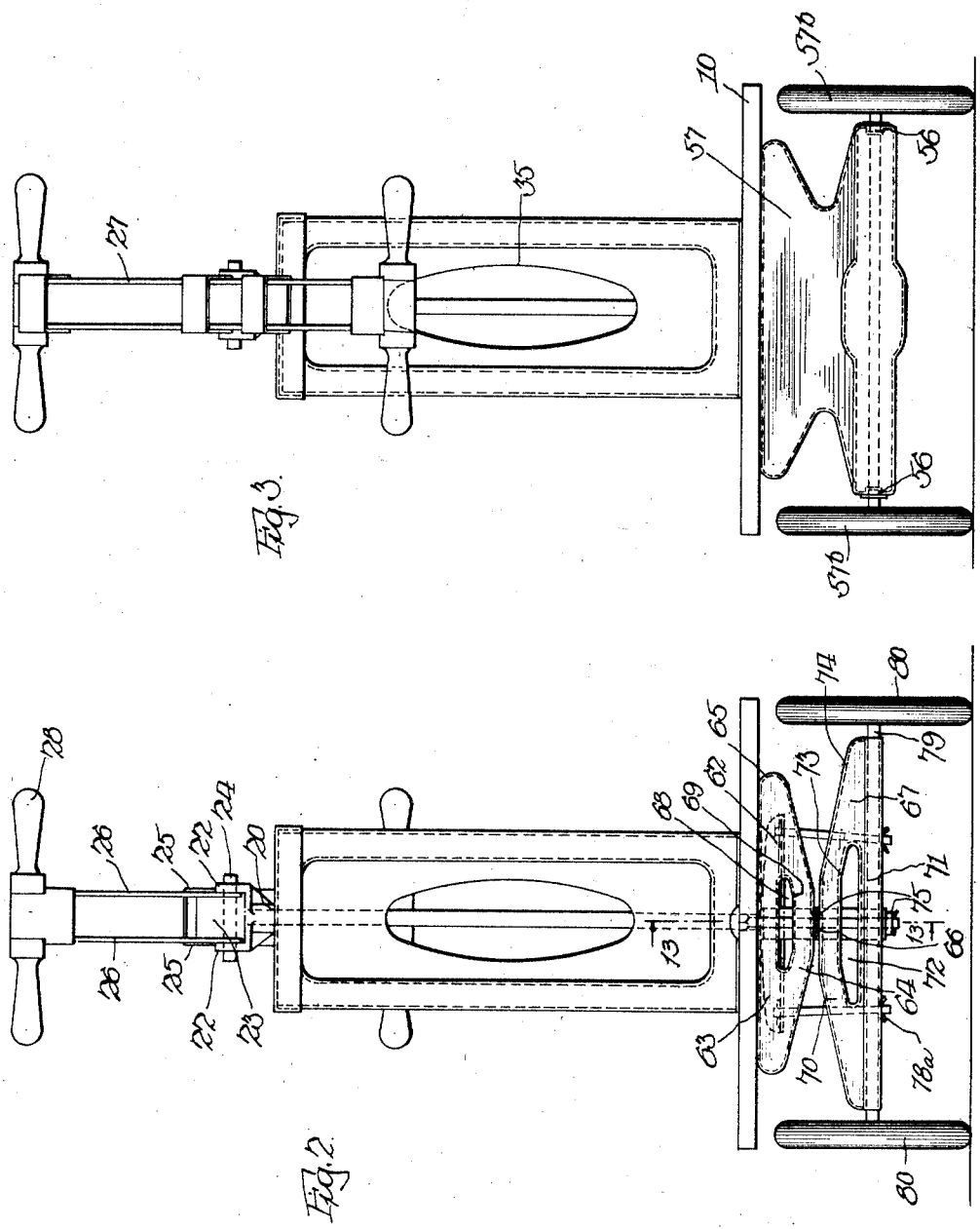

Inventor:
Frederick A. Lundahl
By George I. Haight
Atty.

Aug. 6, 1929.  F. A. LUNDAHL  1,723,553
VELOCIPEDE
Filed Oct. 13, 1926    4 Sheets-Sheet 4
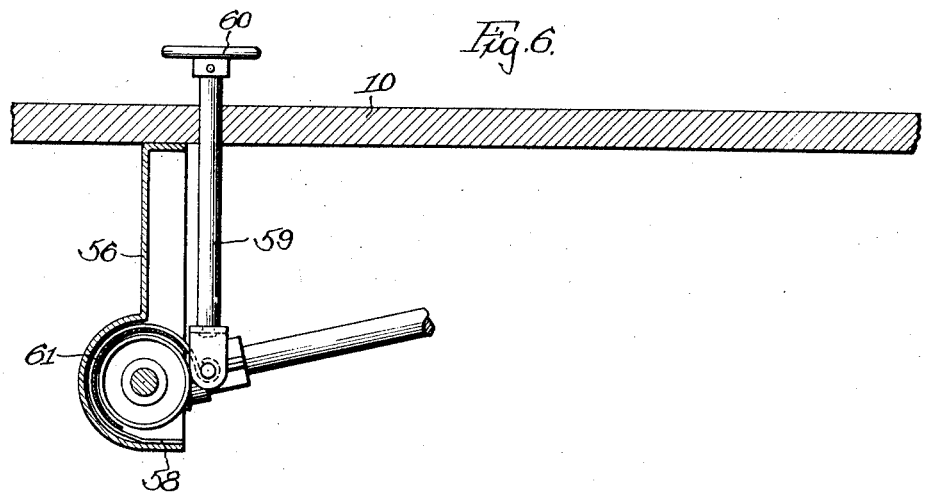
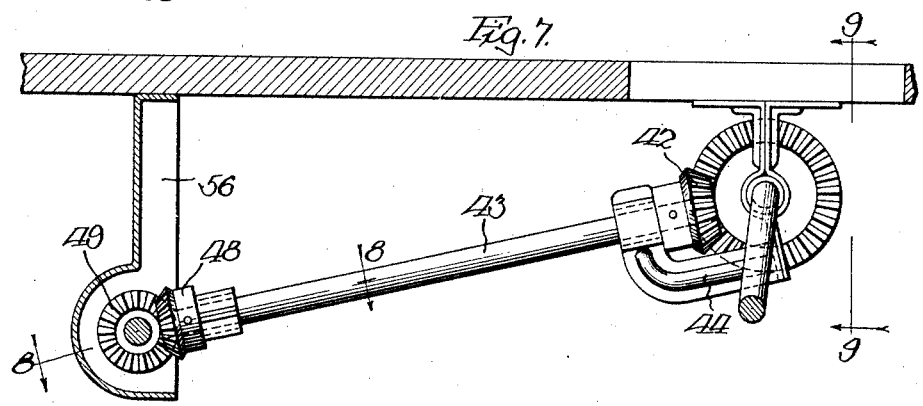
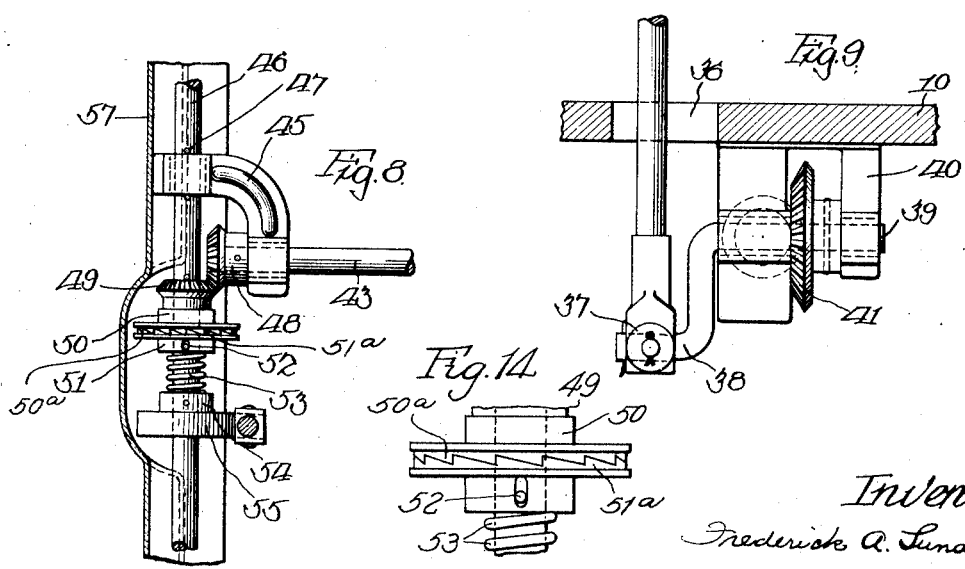

Patented Aug. 6, 1929.

1,723,553

UNITED STATES PATENT OFFICE.

FREDERICK A. LUNDAHL, OF EAST MOLINE, ILLINOIS.

VELOCIPEDE.

Application filed October 13, 1926. Serial No. 141,345.

This invention relates to velocipedes.

An object of the invention is to provide a velocipede in the form of a hand car wherein means are provided for propelling the hand car which means may be manipulated in such manner as to steer the hand car.

A further object of the invention is to provide in a hand car, driving or propelling mechanism, including handles, and a clutch arrangement, whereby operation of the handles propels the car in a forward direction, and when operation of said handles is discontinued, the driving mechanism is thrown out of engagement to permit the car to travel until its momentum is checked by a suitable brake, the handles being so connected with the steering mechanism, that the car may be steered both when the handles are being operated to drive the car and when the operation thereof is discontinued.

Other and further objects of the invention will more clearly appear from the description and claims hereinafter following.

Figure 4:
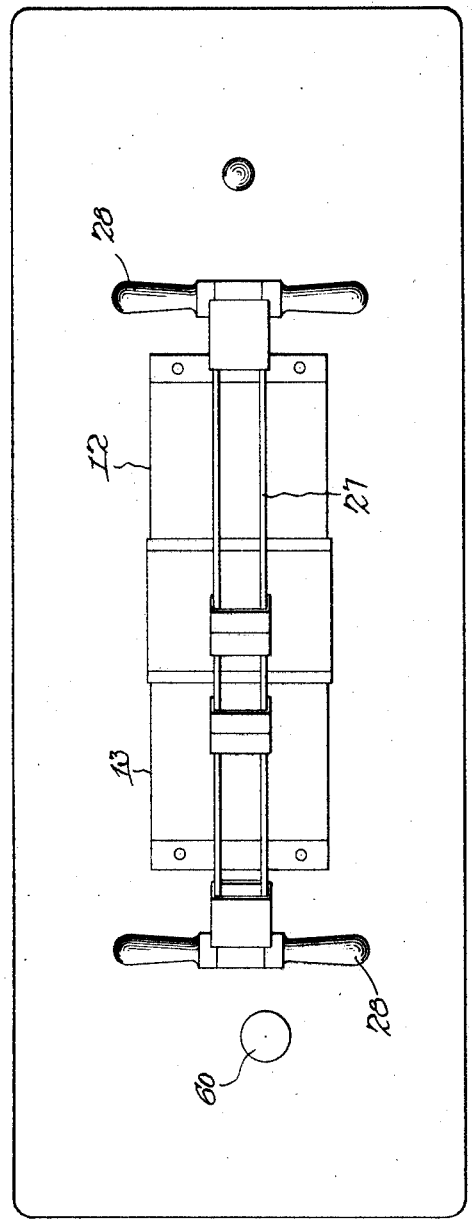
Figure 5:
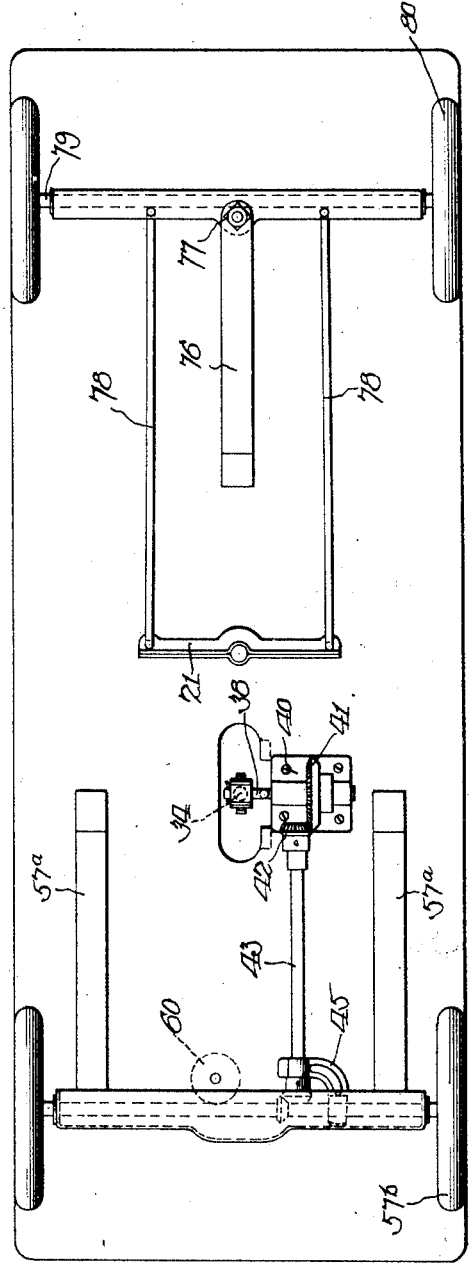

In the drawings, forming part of this specification, Figure 1 is a side elevational view of the hand car embodying my invention. Figure 2 is a front elevational view of said hand car. Figure 3 is a rear elevational view of said hand car. Figure 4 is a top plan view of the hand car. Figure 5 is a bottom plan view of the hand car. Figure 6 is a fragmentary, longitudinal, vertical central sectional view through the rear bolster and axle, showing the brake mechanism associated with the invention. Figure 7 is a fragmentary, longitudinal, vertical section through the rear portion of the car, showing the driving mechanism of the hand car, parts of the same being illustrated in elevation. Figure 8 is a horizontal sectional view through the driving mechanism taken on a line corresponding substantially to the line 8—8 of Figure 7. Figure 9 is a fragmentary, transverse, vertical, sectional view of the invention taken on a line corresponding substantially to the line 9—9 of Figure 7 and showing portions of the mechanism in elevation. Figure 10 is an enlarged fragmentary vertical sectional view through the upper portion of the pedestal and showing the mounting of the steering shaft and the connection between the steering shaft and operating lever. Figure 11 is an enlarged fragmentary side elevational view showing the connection between the operating lever and the connecting rod for transmitting the movement of said lever to the driving gears. Figure 12 is a fragmentary enlarged vertical sectional view corresponding to line 12—12 of Figure 11. Figure 13 is an enlarged vertical sectional view of the forward portion of the vehicle and corresponds to line 13—13 of Figure 2. And Figure 14 is an enlarged top plan view of the clutch mechanism of the vehicle.

Referring more particularly to the drawings, 10 denotes the platform or body of the hand car, said body portion being preferably of rectangular configuration. Mounted centrally upon the upper surface of the body portion 10 is a support or pedestal 11, said pedestal including front and rear plates 12 and 13, said plates being spaced apart at the bottom portions thereof a relatively great distance, and converging upwardly. Each of the plates 12 and 13 is made up of relatively heavy gauge sheet metal pressed into form so as to provide a laterally extending, channel-shaped formation along the edges thereof, with a connecting web extending between the inner walls of the channel formation. Each of the plates 12 and 13 is provided at its bottom extremity with a flange 14 adapted to be secured to the body portion 10. The plates 12 and 13 are also connected together by longitudinally extending braces 15—15. The upper end portions of the plates 12 and 13 have fitted thereover an inverted, pan-shaped cap 16, the horizontal wall of said cap being provided with a journal opening 17. Rotatably journaled in the cap 16, and the body portion 10 is a shaft 18, said shaft being provided at its upper end with a fitting 19, the lower end of which provides a shoulder which bears upon the upper surface of the cap 17 and supports the shaft 18 against dropping. The lower end of the shaft 18 is journaled in a suitable bearing opening provided in the platform 10 and the lower end of the shaft has rigidly affixed thereto a cross arm 21 associated with the steering mechanism of the vehicle as hereinafter described in detail, the cross piece 21 maintaining the shaft 18 against upward movement. The upper portion of the fitting 19 is provided with spaced ears 22, between which is pivotally mounted a journal section 23 by means of a pivot pin 24, said journal section being made up of sheet metal and having extensions 25 which are spot-welded to spaced, flat metal bars 26—26 which form part of the handle or lever 27, the connection of the journal section with the lever 27 being located substantially midway between the end portions of said lever. The outer ends of the lever 27 have secured thereto hand grip portions 28—28, by which the lever may be oscillated vertically about the axis provided by the pivot pin 24, and it should also be appreciated that swinging of the lever 27 laterally with reference to the longitudinally axis of the vehicle will impart rotation to the shaft 18.

Somewhat to the rear of the pivotal connection formed by the pin 24, and secured to the lever 27 is a second journal section 29 which pivotally carries a block 30, having trunnions thereon indicated at 31 adapted for the pivotal reception of ears 32—32 formed on a fitting 33 which is rigidly secured to a connecting rod 34, providing a universal connection of the rod 34 with the lever 27. The connecting rod 34 extends downwardly through an opening 35 in the rear plate 13, and through an elongated slot 36 in the body portion 10, the lower extremity of the rod having a universal joint connection indicated at 37, with a crank 38 forming part of a shaft 39 which is rotatably mounted in a suitable bracket 40 secured to the under surface of the body portion 10. The shaft 39 carries a beveled gear 41 which meshes with a beveled gear 42 rigidly mounted upon a driving shaft 43, the forward end of the driving shaft being supported by suitable extension 44 on the bracket 40. The rear end of the driving shaft 43 is supported by bracket 45 rotatably supported upon the rear axle 46, there being pins 47 on said axle for preventing movement of the bracket 45 longitudinally with reference to the axle. The rear extremity of the shaft 43 is provided with a beveled gear 48 which meshes with a beveled gear 49 loosely mounted on the axle 46. The gear 49 has a clutch extension 50 having beveled teeth 50ª thereon adapted to engage the teeth 51ª of a clutch member 51, which is splined upon the axle 46 by means of a slot and pin connection 52, there being a spring 53 bearing against the clutch part 51 and normally urging the same toward engaged position, the opposite end of the spring bearing against a collar 54, keyed to the axle 46, said collar having formed integrally therewith a drum 55 hereinafter more fully referred to. The axle 46 is journaled in the end walls 56—56 of the rear body bolster 57, which in turn is rigidly affixed to the platform or body portion 10 as shown, and braced by longitudinally extending struts 57ª, said axle having wheels 57ᵇ thereon, one of which is a drive wheel rigidly secured to said axle, and the other of which is rotatably mounted thereon. Secured to the metal of the bolster 57 at the bottom portion thereof is one end of a spring 58, said spring extending about the brake drum 55 as best shown in Figure 6, the free end of said spring being pivotally connected with a push rod 59 mounted for reciprocation in the body portion 10 of the vehicle, said rod having at its upper end a foot piece 60, by which the push rod 59 may be depressed, said rod being normally maintained in elevated position by the spring 58. The spring 58 is provided with a brake lining 61 adapted to bear upon the drum when the rod 59 is depressed.

The forward portion of the body member 10 has secured to its under surface a bolster 62. The bolster 62 is made up of sheet metal and includes upper and lower members 63 and 64 pressed from a single piece of sheet metal, the marginal edges of the members 63 and 64 being provided with a flange 65, the flange 65 at the central portion of the member 64 being pressed out to provide a central boss 66 adapted to fit into a central plate formed on the movable bolster 67. The bolster 62 is provided with a cut-out portion 68 which defines the upper and lower members 63 and 64, there being a pressed flange 69 surrounding the cut-out portion. The movable bolster 67 comprises upper compression member 70 and lower tension member 71, said members being defined by a cut-out portion 72 surrounded by a strengthening flange 73. The bolster 67 is stamped out of a single sheet of material and is provided with a marginal flange 74 along its edges, the flange 74 at the upper portion of the compression member 70 having a centrally disposed, pressed, cup-shaped, center plate 75 adapted for the reception of the boss 66 on the fixed bolster 62. A king pin 76, having a squared portion upon its shank is fitted into a suitable socket formed in the body portion 10, the shank of said king pin extending downwardly through the flanges 65, the boss 66, the center plate 75, and the flange 74 at the bottom of the member 71, and the lower end of the king pin extends through one end of a brace 76, which has its opposite end secured to the under surface of the body portion 10, there being a nut 77 threaded upon the extremity of the king pin to hold the same in position. Steering rods 78—78 are provided each of which has one end pivotally connected to one end of the cross piece 21, while the opposite end of each of the rods 78 is pivotally connected to the flange 74 where it extends along the bottom of the member 71, as best shown in Figures 1, 2, and 5. Suitable cotter pins 78ª are provided which extends through the ends of the rods 78 to maintain the same in position. The bolster 67 carries the front axle 79, and front wheels 80—80 are rotatably mounted upon the opposite ends of said axle.

In operation, one or more persons, usually children, may ride upon the velocipede, and in the event there are two, one stands on the forward portion of the platform 10, while the other stands upon the rear portion of said platform, and both face toward the pedestal 11 so as to be in position to grasp the handles 28 upon the push bar or lever 26. The lever 26 is then rocked about the fulcrum provided by the pivot pin 24, which movement is transmitted through the connecting rod 34 to the crank 38, so as to rotate said crank in a clockwise direction. Rotation of the crank 38 effects movement of the beveled gear 41, said gear meshing with the gear 42, imparting rotation to the driving shaft 43, which rotation is transmitted through the gear 49, and clutch parts 50 and 51 to the axle 46 bringing about rotation of the rear wheels and propulsion of the vehicle. During travel of the vehicle in a forward direction while the handle is being operated, by exerting force in a lateral direction upon the handle or lever 26, rotation of the shaft 18 about its axis may be effected, which movement is transmitted through the cross piece 21 affixed to the shaft 18, to the steering rods 78—78, and thence to the pivoted bolster 67 which carries the front axle, this movement being permitted by the universal joints between the connecting rod 34, the lever 26, and the crank 38. Due to the provision of the clutch mechanism on the axle 46, while the vehicle is still in motion, the operation of the lever 26 may be suspended, arresting movement of the connecting rod 34, driving shaft 43 and gear 49, which will cause the clutch part to be forced outwardly against the pressure of the spring so as to disconnect the gear 49 from its driving connection with the axle 46, thereby eliminating any possible danger to the passengers on the hand car, due to excessive speed of the lever 26 as when the vehicle is travelling downgrade.

The vehicle may be steered while rocking movement of the lever 26 is suspended by moving the same in a lateral direction, in the same manner as when rocking movement of the lever is taking place, as above referred to. The brake is provided for checking the speed of the vehicle, or stopping the same, and due to the presence of the spring 58, the brake is normally held in disengaged position. When it is desired to apply the brake, the foot piece 60 is depressed, depressing the rod 59, which tightens the brake belt about the drum 55, which retards rotation of the rear axle, and consequently the rear wheels affixed thereto.

While I have herein shown and described what I consider the preferred manner in carrying out the invention, the same is merely illustrative and I contemplate all changes and modifications which come within the scope of the claims appended hereto.

I claim:

1. In a wheeled hand car supported by a plurality of wheels, the combination with a rocking lever; means for actuating certain of said wheels propelling said vehicle through movement of said lever in one direction; and means for adjusting another of said wheels steering said vehicle through movement of said lever in another direction.

2. In a hand car, the combination with a lever; of propelling means connecting said lever with the running gear of said car, said means including mechanism for driving said running gear when said lever is operated, and for disengaging the driving connection of said mechanism with said running gear, when movement of said lever is arrested; and means for steering said car, said steering mechanism having an operative connection with said lever whereby movement of said lever in certain directions will effect steering of said vehicle.

3. In a hand car, the combination with a body portion provided with a central support; a shaft confined to rotary movement in said support; a lever fulcrumed intermediate its ends upon said shaft to rock thereon and arranged to be manipulated to rotate said shaft; a crank arranged to be rotated to effect propulsion of said vehicle; a connecting member having universal connection with said crank at one end, and a universal connection with said lever at its opposite end adjacent to and spaced from the fulcrum of said lever; and means operable when said shaft is rotated by movement of said lever for steering said car.

4. In a hand car of the character described, the combination with a platform provided with driving and steering wheels; of a pedestal extending above said platform; operating mechanism mounted on said pedestal and including a rocking lever confined to movement above said platform; and means connected to said drive wheels and steering wheels and operable in common by movement of said lever in different directions for driving and steering said car.

5. In a velocipede, the combination with a wheeled vehicle having driving and steering wheels; of operating mechanism including a rocking member connected to said drive and steering wheels whereby movement of said rocking member in different directions effects propulsion and steering of said vehicle, the connections for steering said vehicle being indirectly connected to said operating mechanism to avoid tilting of said connections when said lever is operated.

6. In a velocipede, the combination with a wheeled vehicle having driving and steering wheels; of a rotatable shaft supported on said vehicle; means connecting said shaft with the steering wheels; a rocking member supported by said shaft for rocking movement and adapted to rotate said shaft; and connections extending from said rocking member to said drive wheels for propelling the vehicle.

7. In a hand car, the combination with a platform provided with driving and steering wheels; means for operating the steering wheels; means for driving said driving wheels, said latter means including clutch mechanism through which said driving means may be disconnected; and an operating lever operatively controlling said clutch mechanism, said steering means and said driving wheels, whereby manipulations of said lever in various directions effects selective driving, steering and coasting of said hand car.

8. In a hand car of the character described, the combination with a wheeled vehicle having driving and steering wheels; of driving mechanism including a rotatable clutch member; steering mechanism; and means for selectively controlling said driving means, clutch mechanism and steering mechanism, said latter means consisting of a single lever co-ordinated with respect to said driving means, clutch mechanism and steering mechanism whereby manipulation of said lever effects selective control of said driving mechanism, clutch mechanism and steering mechanism.

In witness that I claim the foregoing I have hereunto subscribed my name this 2nd day of September, 1926.

FREDERICK A. LUNDAHL.